United States Patent [19]
Shinomura

[11] 3,935,047
[45] Jan. 27, 1976

[54] PROCESS FOR THE PREPARATION OF A SYNTHETIC WOOD

[75] Inventor: Toshihiko Shinomura, Yokohama, Japan

[73] Assignee: Nippon Oil Company Ltd., Tokyo, Japan

[22] Filed: May 15, 1974

[21] Appl. No.: 470,236

[30] Foreign Application Priority Data
May 17, 1973   Japan.............................. 48-54122
May 17, 1973   Japan.............................. 48-54123
May 17, 1973   Japan.............................. 48-54124

[52] U.S. Cl. ............... 156/163; 156/164; 156/229; 156/242; 156/306; 156/309; 156/322; 156/324
[51] Int. Cl.² ..................... B32B 31/12; C09J 7/00
[58] Field of Search ............. 156/242, 243, 244, 77, 156/78, 79, 160, 163, 164, 306, 309, 322, 324, 229; 264/48, 54, 175

[56] References Cited
UNITED STATES PATENTS

| | | |
|---|---|---|
| 3,275,720 | 9/1966 | Ohsol.................................. 264/54 |
| 3,619,344 | 11/1971 | Wolinski et al..................... 156/309 |
| 3,720,572 | 3/1973 | Soda et al............................ 156/78 |
| 3,741,841 | 6/1973 | Toyoda et al....................... 156/163 |
| 3,823,047 | 7/1974 | Colombo............................ 156/322 |

Primary Examiner—Caleb Weston
Attorney, Agent, or Firm—Frank J. Jordan

[57] ABSTRACT

A process for preparing a synthetic wood comprises fusion mixing a thermoplastic resin and a particulate filler, molding the resulting mixture into sheets, monoaxially drawing the sheets, arranging the drawn sheets one upon another and then rapidly heating the thus-arranged drawn sheets to fusion bond them together thereby obtaining the synthetic wood. In one embodiment the sheets may allow a thermoplastic resin film to be inserted between any adjacent two sheets before the heating step, and in another embodiment the sheets may be coated with a thermoplastic resin before or after the drawing step.

8 Claims, 4 Drawing Figures

PROCESS FOR THE PREPARATION OF A SYNTHETIC WOOD

This invention relates to a process for the preparation of wood-like materials for use mainly as construction, packing and other industrial materials.

There have already been reported some wood-like materials made of synthetic high molecular material as the base material. Typical of these known materials are a material obtained by the low foaming of a synthetic resin, a material prepared by the addition of fine hollow particles to a synthetic resin, a hydrous polyester and a material prepared by highly filling a synthetic resin with pigment. Certain of these known wood-like materials have begun to be put to practical use depending on their particular features; however, they are generally inferior in strength, elastic modulus, later workability and the like, and they also raise problems as to their disposal and regeneration. Thus, at present, there are no conventional wood-like materials which have satisfactory balanced properties.

Attempts have been made by the present inventors to obtain wood-like materials which are excellent in strength and elastic modulus and are well-balanced in later workability and disposability, thus accomplishing this invnvention.

An object of this invention is to provide a process for the preparation of wood-like materials for use mainly as construction, packing and other industrial materials.

This and other objects, as will hereinafter become more readily apparent, can be attained in the following ways.

In a first embodiment of this invention, a desired wood-like material is obtained by melt mixing 100 parts by weight of at least one thermoplastic resin with 5 – 400 parts of at least one particulate filler; forming the mixture to sheets; monoaxially drawing or stretching the thus-formed sheets to an extent that a drawing ratio of 50 – 1500% is reached; rapidly heating or heating the drawn sheets for a time enough to heat their surfaces to their melting point or higher while allowing their interior temperature to remain lower than said melting point; superposing the heated sheets one upon another; laminating or fusion bonding the thus-arranged sheets together under pressure; and then allowing the thus-laminated mass to cool thereby obtaining the desired wood-like material.

In a second embodiment of this invention, a desired wood-like material is obtained by following the same procedure as taken in said one embodiment of this invention except that the drawn sheets and thermoplastic resin-made films are alternately superposed one upon another before laminated under pressure, the films having a lower melting point than the sheets and being capable of being easily fusion bonded thereto.

In a third embodiment of this invention, a desired wood-like material is obtained by following the same procedure as used in the first embodiment of this invention with the exception that the sheets as formed are coated with a thermoplastic resin on at least one side thereof to form composite sheets by the use of a co-extrusion or lamination method before or after drawn, the thermoplastic resin so coated on the sheets being capable of melting at lower temperatures than the sheets and of being easily bonded thereto.

Thermoplastic resins which may be used for the sheets include polyolefins such as polyethylene and polypropylene; homopolymers such as polystyrene, polyvinyl chloride, polyvinylidene chloride, polyesters and polyamide; copolymers prepared mainly from the same monomers as those from which the said homopolymers were prepared; and the blends thereof. They further include mixtures of these homopolymers, copolymers and blends as the base, with rubber and other polymers. In addition, they may be incorporated with anti-aging agents, absorbents for ultraviolet rays, fluorescent materials for increasing whiteness, antistatic agents and flame-retarding agents, as required.

Thermoplastic resins for the films used in the second embodiment should be low-density polyethylene, ethylene-vinyl acetate copolymers, ethylene-acrylic acid copolymers and the like if those for the sheets used are high-density polyethylene; they should be chlorinated polypropylene, maleic-modified polypropylene and the like if the sheets are made of polypropylene; and they should be soft polyvinyl chloride if the sheets are made of rigid polyvinyl chloride. In addition, other suitable thermoplastic resins may be used depending on the kind of thermoplastic resins of which the sheets are made.

Thermoplastic resins to be coated on the sheets in the third embodiment of this invention should be low-density polyethylene, ethylene-vinyl acetate copolymers, ethylene-acrylic acid copolymers and the like if the sheets are made of high-density polyethylene; they should be chlorinated polypropylene, maleic-modified polypropylene, low-density polyethylene and the like if the sheets are made of polypropylene; and they should be soft polyvinyl chloride and the like if the sheets are made of rigid polyvinyl chloride. In addition, they may be of any suitable type depending upon the kind of material of the sheets.

Particulate fillers which may be used in this invention include calcium carbonate, magnesium carbonate, calcium sulphate, calcium sulphite, silicon dioxide, titanium dioxide, barium sulphate, diatomaceous earth, talc, clay, saw dust, pulp powder, Hedoro and carbon black. The fillers should preferably be about 5-mesh or finer in particle size.

The process of this invention will hereinafter be illustrated in more detail.

One hundred parts by weight of a thermoplastic resin and 5 – 400 parts by weight of a particulate filler are melt blended together on a Banbury mixer, a kneader or the like, forming the thus-obtained melt blend to sheets by the use of a calender molder, monoaxially drawing the sheets so formed by using a longitudinally drawing machine or the like, rapidly heating the drawn sheets under tension to prevent their thermal shrinkage, in such a manner that their surface is heated to temperatures preferably ranging from their melting point to a temperature higher than said melting point by about 10°C while their interior remains at temperatures lower than their melting point, stacking the heated sheets one upon another followed by being pressed together or passing them through between rollers to obtain a synthetic wood in which the sheets are pressure bonded to each other. The lamination of such drawn sheets may be effected while arranging them one upon another so that their drawn directions are in accord with each other or, if desired, are alternately intersected at right angles. The term "melting point" used herein is intended to mean "melting point" for crystalline high molecular compounds such as polyethylene, polypropylene, Tetron (Trademark indicating a polyester) and nylon and also to mean "glass transition point" for non-crystalline high molecular compounds such as polystyrene and polyvinyl chloride.

Another illustration of the process of this invention is as follows.

One hundred parts by weight of a thermoplastic resin and 5 – 400 parts by weight of a particulate filler are dry blended with each other by the use of a supermixer, Henschel mixer or the like, and the resulting blend is extruded to sheets which are monoaxially drawn and then laminated under heat and pressure.

In said illustrated processes of this invention, a thermoplastic film, which has a lower melting point than the sheets and can be satisfactorily fusion bonded thereto, may be inserted between the adjacent sheets followed by laminating the whole mass; or the sheets may be coated, on at least one side, with the same thermoplastic resin as the aforesaid thermoplastic film before they are drawn.

It has been found by the present inventors that the monoaxial drawing of the sheets composed of a thermoplastic resin and particulate filler in admixture will produce voids around the filler particles thereby obtaining homogeneous closed-cellular sheets, and that the monoaxial drawing allows the thermoplastic resin molecules of the sheets to be oriented in the drawing direction thereby remarkably improving the sheet in properties with the result that there is obtained a laminate having a homogeneous closed-cellular structure and remarkably excellent properties with respect to the longitudinal direction thereof when the drawn sheets are fusion bonded to each other under pressure while preventing the thermal shrinkage thereof after they are superposed one upon another so that their drawn directions are in accord with each other.

Wood is originally superior in properties with respect to its longitudinal direction (direction of the fibers in wood) and inferior therein with respect to its lateral direction. Thus it has long been customary to use wood in such a manner that the advantage of its excellent properties with respect to its longitudinal direction is taken. It was therefore considered that if there is obtained a synthetic wood wherein the properties with respect to the longitudinal direction (hereinafter referred to as "longitudinal direction properties") are made remarkably excellent as compared with those with respect to the lateral direction (hereinafter referred to as "transverse or lateral direction properties"), then the thus-obtained synthetic wood will be one which is very highly similar to natural wood, thus accomplishing this invention.

This invention will be understood in greater detail by the following explanation in conjunction with the accompanying drawings in which.

Figure 1:
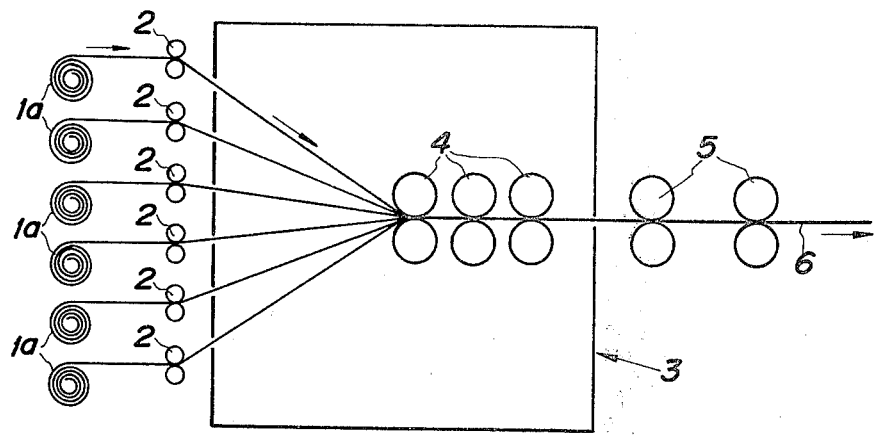
FIG. 1 is a diagrammatic view of a process for the lamination of drawn sheets, embodying this invention.

Referring now to FIG. 1, monoaxially drawn thermoplastic resin sheets 1 supplied from reels are passed through clip rolls 2 to a thermostatically controlled chamber 3 where they are rapidly heated to suitable temperatures and passed through pressure laminating rolls 4 to fusion bond them to each other thereby producing laminated sheets. The laminated sheets are further passed through cooling rollers 5 to be cooled thus obtaining a synthetic wood 6. The product 6 is then cut into pieces of a predetermined length. It is of course possible to obtain an excellent synthetic wood wherein the longitudinal and lateral direction properties are well balanced, by stacking the sheets one upon another so that their drawn directions are alternately crossed at right angles and then laminating the thus-arranged sheets by the use of heat and pressure.

Figure 2:
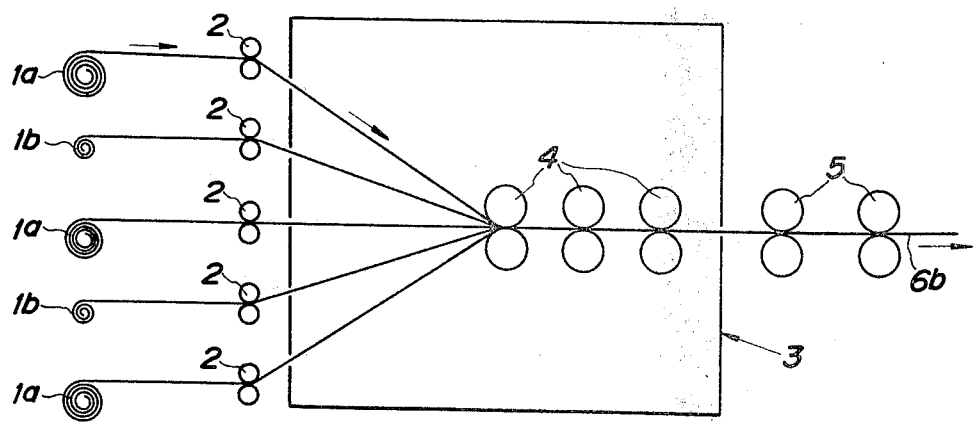
FIG. 2 is a diagrammatic view showing a modification of the process of FIG. 1.

With reference to FIG. 2, a modified process will be explained as follows. Monoaxially drawn sheets 1a from reels and thermoplastic resin films 1b from reels each positioned between the adjacent ones for said drawn sheets 1a, are passed through clip rolls 2 and then treated in the same manner as explained with reference to FIG. 1 to obtain a synthetic wood 6 which is then passed to a cutting step (not shown); the thermoplastic resin films used in this modified process are those which have a lower melting point than the sheets and can easily be bonded thereto and, in order to laminate the films and sheets, they are heated for a time enough to heat the resin films to temperatures preferably ranging from the melting point of the films to a temperature higher than said melting point by about 30°C while permitting the interior of the sheets to remain at temperatures lower than the melting point of the sheets in this modified process.

Figure 3:
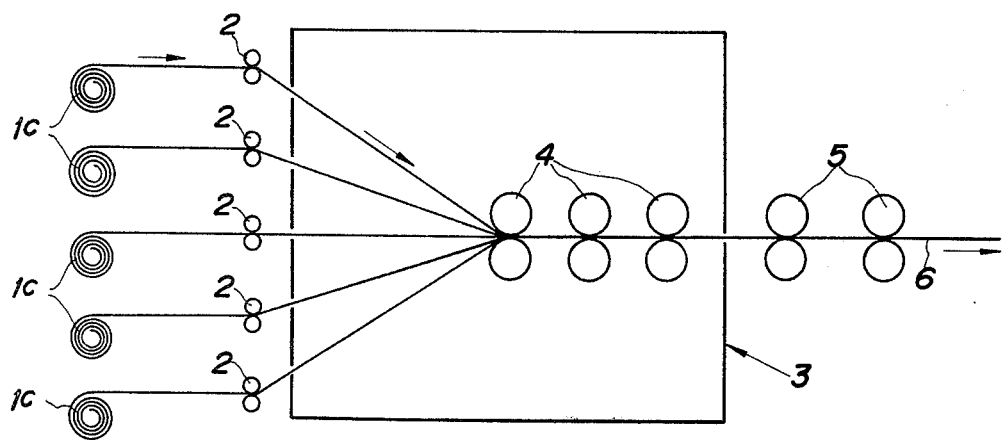
FIG. 3 is a diagrammatic view showing another modification of the process of FIG. 1.
Figure 4:
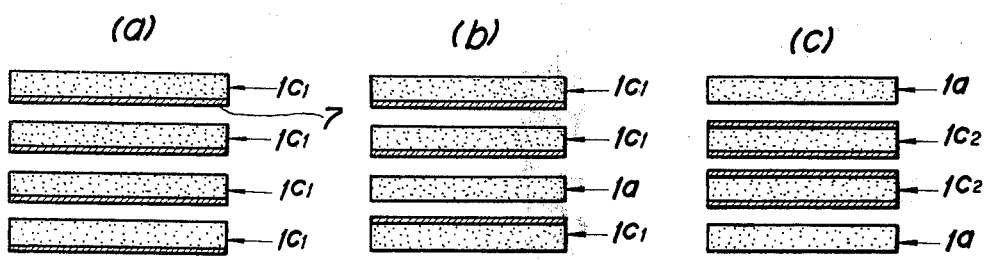
FIG. 4 is a diagrammatic view illustrating combinations of drawn, thermoplastic resin-coated sheets used in the modified process of FIG. 3.

Referring to FIGS. 3 and 4, another modified process of this invention will be explained below. The numeral 1c indicates a drawn or stretched composite sheet prepared by monoaxially drawing a composite sheet comprising a sheet substrate and a thermoplastic resin coated on at least one side thereof. The thermoplastic resin so coated has a lower melting point than the sheet substrate and can easily be bonded thereto. The monoaxially drawn composite sheets 1c from reels are passed through clip rollers 2 into a thermostatically controlled chamber wherein they are heated to temperatures approximating the melting point of the thermoplastic resin coating 7. The composite sheets so heated are then treated in the same manner as previously explained, thereby obtaining a synthetic wood 6 which is subsequently passed to a cutting step (not shown).

With reference to FIGS. 4a, 4b and 4c, there are illustrated various combinations of the sheet substrate 1a, composite sheet $1c_1$ having a coating at one side and composite sheet $1c_2$ having a coating at each side.

The synthetic wood obtained by the process of this invention has a foamed structure, that is, a homogeneous closed-cellular structure formed by the creation of voids in the drawing step. Therefore, the synthetic wood is very excellent in heat insulation and other properties as compared with similar materials having the same foam or cellular structure and can be obtained as a highly foamed one.

Thus the synthetic wood obtained according to this invention as compared with conventional synthetic wood, is very excellent in various properties (especially longitudinal direction, that is, drawn direction properties), is capable of being obtained as a homogeneous closed-cellular type foam plastic and is a wood-like material of high quality obtainable at a decreased cost for its volume and properties.

In the first embodiment of this invention it is important to stack the drawn sheets one upon another and laminate them under pressure while they are heated for a time enough to heat their surfaces to temperatures preferably ranging from their melting point to a temperature higher than said melting point by about 10°C and allow their interior temperature to remain lower than their melting point. The reason for this is that it is necessary to keep the surfaces of the sheets at temperatures equal to, or higher than, their melting point in order to effect a fusion bond between the sheets, while it is also necessary to keep the interior of the sheets at temperatures lower than their melting point not to crush the voids or cells created in the sheets when applying a pressure thereon in the lamination step. To this end, for example, the drawn sheets 1a may be passed through the thermostatically controlled chamber 3 at such a travelling velocity as to create a sharp temperature gradient in the sheets and it is desirable that the drawn sheets be sufficiently thick and the clearance between the clip rolls 2 be not made narrower than necessary (refer to FIG. 1).

In the second embodiment of this invention, the drawn sheets 1a and the thermoplastic resin films 1b inserted between the adjacent sheets 1a should be kept at temperatures which are considerably lower than the melting point of the drawn sheets 1a and at which the films 1b can be fusion bonded to the adjacent sheets 1a, in the lamination step. The pressure for the lamination should be suitable, not too high. The use of unduly high temperatures and/or pressures is not desirable since it tends to crush the voids present in the drawn sheets 1a (refer to FIG. 2).

In the third embodiment, the composite sheets 1c should be kept at as low temperatures as possible as far as the resin coating 7 of the sheets 1c can be fusion bonded to the adjacent materials in the lamination step and the pressure for the lamination should be suitable, not too high. The use of too high temperatures and/or pressures is not desirable since it will crush the voids present in the composite sheets 1c (refer to FIGS. 3 and 4).

If a natural wood sheet or a wood grain-printed paper or plastic sheet, is used as at least one of the outermost layers in the lamination step according to this invention, then the resulting synthetic wood will have the same appearance as natural wood.

This invention will be better understood by the following examples in which all parts are by weight unless otherwise indicated.

COMPARATIVE EXAMPLES 1 – 2

For comparison, in Table 1 are shown the properties of natural cedar wood and of a low foamed polystyrene (a conventional synthetic wood supplied under the trakemark of MIRAWOOD by Toyo Chemical Co., Ltd., Japan).

EXAMPLE 1

One hundred parts of polyethylene (density, 0.960; melt index, 5) and 100 parts of calcium carbonate were fusion blended together on a Banbury mixer at temperatures of 160°– 200°C expressed by the resin temperatures, pelletized and extruded by the use of an extruder, T die at resin temperatures of 190° – 240°C to sheets of 2 mm in thickness. The sheets so molded were monoaxially drawn to an extent that a drawing ratio of 700% was reached by a roll-type longitudinally drawing machine at a roll temperature of 140°C and passed to a thermostatically controlled chamber at a temperature of 130°C wherein they were passed through between rolls to fusion bond them to each other under pressure with their drawn directions being kept parallel to each other while preventing the thermal shrinkage of the sheets, thereby obtaining a 5 mm thick plate-like material (refer to FIG. 1). The properties of the plate-like material so obtained are indicated in Table 1 from which said material is found to be very excellent in longitudinal (drawn) direction properties.

EXAMPLE 2

One hundred parts of polyethylene (density, 0.956; M.I., 0.3), 400 parts of calcium sulphite, 20 parts of SBR 1500 (Trademark, styrene-butadiene rubber) and 3 parts of VLTN-5 (Trademark, lubricating agent produced by Kawaken Fine Chemical Co., Ltd., Japan) were fusion mixed with each other at a resin temperature of 170° – 180°C by the use of a kneader and the resulting fusion mixture was molded to 0.5 mm thick sheets by a calender molding machine (roll temperature, 180° – 190°C). The sheets so obtained were monoaxially drawn to an extent of a drawing ratio of 50% being reached, by using a roll-type longitudinally drawing machine (roll temperature, 140° – 150°C). The drawn sheets, as shown in FIG. 1, were then passed to a thermostatically controlled chamber at 120°C wherein they were passed through between rolls to fusion bond them with their drawn directions kept parallel to each other in a laminated form, thereby obtaining a 10 mm thick plate-like material the properties of which are shown in Table 1. From this Table it is seen that the plate-like material so obtained have excellent longitudinal direction properties.

EXAMPLE 3

One hundred parts of polypropylene (M.I., 2) and 5 parts of clay were dry blended together by the use of a super-mixer and extruded by using an extruder, T die (resin temperature, 210° – 240°C) to 2 mm thick sheets which were monoaxially drawn to an extent that a drawing ratio of 1500% was attained by the use of a roll-type longitudinally drawing machine (roll temperature, 130° – 140°C). The drawn sheets, as shown in FIG. 1, were then passed to a thermostatically controlled chamber at 120°C, while preventing the thermal shrinkage, wherein they were passed through between rolls to fusion bond them with their drawn directions kept parallel to each other thereby obtaining a laminated article which was a 5 mm thick plate-like material. The properties of the plate-like material are indicated in Table 1 from which it is seen that said material is very excellent in longitudinal direction properties.

EXAMPLE 4

One hundred parts of polystyrene (M.I., 1.4) and 50 parts of magnesium carbonate were fusion mixed together on a kneader (resin temperature, 160° – 180°C) and compression molded by a press at 200°C to 2 mm thick sheets which were passed to an air thermostatically controlled chamber at 130°C wherein they were monoaxially drawn to an extent that a drawing ratio of 600% was attained. The sheets so drawn were superimposed one upon another with their drawn directions kept parallel to one another and were pressed as soon as sandwiched in a press at 110°C to prevent the sheets from being thermally shrunk and to fusion bond them together thereby obtaining a 5 mm thick plate-like material. Table 1 indicates that the plate-like material so obtained is very superior in longitudinal direction properties.

EXAMPLE 5

Using a Banbury mixer (resin temperature, 170° – 200°C), there were fusion mixed 100 parts of polyvinyl chloride (average degree of polymerization, 800), 10 parts of tricresyl phosphate, 5 parts of DBTM (tin malate type stabilizer produced by Katsuda Kako Co., Ltd., Japan), 2 parts of DBTL (tin laurate type stabilizer produced by Katsuda Kako Co., Ltd.), 3 parts of VLTN-5 (lubricating agent produced by Kawaken Fine Chemical Co., Ltd.) and 50 parts of saw dust (50 mesh pass) to form a fusion mixture which was molded to 0.5 mm thick sheets by using a calender molder (roll temperature, 190°C). The sheets so obtained were monoaxially drawn by the use of a roll-type longitudinally drawing machine (roll temperature, 150°C) to an extent that a drawing ratio of 500% was attained. The drawn sheets, as shown in FIG. 1, were passed to a thermostatically controlled chamber at 150° – 160°C while preventing the thermal shrinkage thereof, wherein they were passed through between rolls with their drawn directions being kept parallel to one another thereby to obtain a laminated article in the form of a 5 mm thick plate-like mass. Table 1 shows that this plate-like mass is very superior in longitudinal direction properties.

EXAMPLE 6

One hundred parts of ABS resin (supplied under the trademark of SAICOLAC by Ube Saicon Co., Ltd.) were fusion mixed with 100 parts of calcium sulphate on a Banbury mixer (resin temperature, 170° – 200°C) to form a mixture which was molded into 2 mm thick sheets by the use of a press at 200°C. The sheets thus obtained were placed in an air thermostatically controlled chamber at 140°C wherein they were monoaxially drawn to an extent that a drawing ratio of 400% was attained. The sheets so drawn were stacked one upon another so that their drawn directions were alternately crossed at right angles, after which they were subjected to pressure as soon as sandwiched in a press at 120°C (thus preventing the thermal shrinkage of the sheets) to fusion bond them together thereby obtaining a 5 mm thick plate-like material the properties of which are shown in Table 1. This Table indicates that this plate-like material is very excellent as a synthetic wood.

EXAMPLE 7

One hundred parts of polyethylene (density, 0.957; M.I., 0.9) were fusion mixed with 50 parts of "Hedero" (sediment obtainable from sedimentation ponds of wood pulp-making factories; particle size, 20 mesh pass) on a kneader (resin temperature, 160° – 180°C) to form a mixture which was molded into 4 mm thick sheets by using a press at 180°C. The sheets so obtained were monoaxially drawn to an extent that a drawing ratio of 300% was attained in an air thermostatically controlled chamber at 140°C, and were then superposed one upon another with their drawn directions kept parallel to each other. The drawn sheets so superposed were brought under pressure upon being sandwiched in a press at 130°C to effect a fusion bond therebetween thereby obtaining a 5 mm thick plate-like material. Table 1 shows that this material is very excellent in longitudinal direction properties.

EXAMPLE 8

One hundred parts of polyethylene (density, 0.957; M.I., 0.9) were fusion mixed with 100 parts of carbon black (HAF) on a kneader (resin temperature, 160° – 180°C) to form a mixture which was molded into 4 mm thick sheets by a press at 200°C. The sheets were monoaxially drawn to an extent that a drawing ratio of 400% was attained in an air thermostatically controlled chamber at 150°C, superposed one upon another with their drawn directions kept parallel to each other and then brought under pressure as soon as sandwiched in a press at 130°C, thereby to obtain a 5 mm thick plate-like material. Table 1 shows that this material is an excellent one.

Table 1

|  | *1 Bending modulus of elasticity × $10^{-3}$ L / T (Kg/ cm$^2$) | *1 Bending strength L / T (Kg/cm$^2$) | *2 Tensile strength at break L / T (Kg/cm$^2$) | *3 Izot impact strength L / T (ft-lb / inch of Notch) | Specific gravity |
|---|---|---|---|---|---|
| Comparative example 1 | 66 / 21 | 540 / 114 | 384 / 92 | 21 / 1.5 | 0.3–0.4 |
| Comparative example 2 | 12 / 10 | 205 / 194 | 106 / 102 | 1.8 / 1.5 | 0.55 |
| Example 1 | 72 / 23 | 624 / 126 | 542 / 128 | 22 / 1.3 | 0.4 |
| Example 2 | 55/ 29 | 312 / 118 | 256 / 185 | 7.5 / 1.8 | 0.9 |
| Example 3 | 32 / 11 | 472 / 121 | 412 / 97 | 17 / 1.2 | 0.5 |
| Example 4 | 78 / 26 | 612 / 134 | 411 / 91 | 14 / 1.1 | 0.3 |
| Example 5 | 67 / 23 | 553 / 112 | 452 / 114 | 18 / 1.4 | 0.3 |
| Example 6 | 45 / 44 | 416 / 424 | 246 / 251 | 9 / 8 | 0.5 |
| Example 7 | 64 / 22 | 554 / 121 | 372 / 85 | 12 / 1.0 | 0.4 |
| Example 8 | 62 / 20 | 531 / 119 | 435 / 94 | 21 / 1.6 | 0.4 |

*1 : Measured in accordance with ASTM-D-790
*2 : Measured at a deformation rate of 10%/min. by the use of a tester for tensile strength
*3 : Measured in accordance with ASTM-D-256
L/T: Longitudinal/Transverse
Bending modulus of elasticity = Modulus of elasticity in bending

EXAMPLE 9

One hundred parts of polyethylene (density, 0.960; M.I., 5) were fusion mixed with 120 parts of calcium sulphate on a kneader (resin temperature, 160° – 200°C) to form a mixture which was pelletized and extrusion molded into 3 mm thick sheets by the use of an extruder, T die (resin temperature, 190° 240°C). The sheets so obtained were monoaxially drawn to an extent that a drawing ratio of 800% was attained, by the use of a roll-type longitudinally drawing machine (roll temperature, 145°C). As shown in FIG. 2, the drawn sheets and low-density polyethylene films (M.I., 2;

density, 0.923; thickness, 30 μ) were passed to a thermostatically controlled chamber at 110°C wherein the sheets and the films were passed through between rolls to obtain a 5 mm thick laminated article in which the sheets and the films were alternately superposed one upon another with the drawn directions of the sheets kept parallel to each other and were fusion bonded to each other. The properties of this laminated article are shown in Table 2, from which it is seen that said article is very excellent in longitudinal direction properties.

EXAMPLE 10

One hundred parts of polyethylene (density, 0.956; M.I., 0.3), 400 parts of calcium sulphite and 5 parts of VLTN-5 (lubricating agent produced by Kawaken Fine Chemical Co., Ltd.) were fusion mixed with each other at a resin temperature of 170° – 190°C by the use of a Banbury mixer to form a mixture which was molded into 0.5 mm thick sheets by the use of a calender molding machine (roll temperature, 180° – 190°C). The sheets so obtained were monoaxially drawn to an extent that a drawing ratio of 50% was reached by using a roll-type longitudinally drawing machine (roll temperature, 140° – 150°C). Then, as shown in FIG. 2, the drawn sheets and ethylene-vinyl acetate copolymer films (vinyl acetate content, 10 wt.%; M.I., 1.5; thickness, 20 μ) were introduced to a thermostatically controlled chamber at 100°C wherein the sheets and the films were passed through between rolls to superpose them "film upon sheet" alternately (with the drawn directions of the sheets kept parallel to each other), press and fuse bond them thereby obtaining a 10 mm thick plate-like material. Table 2 indicates that this plate-like material is very superior in longitudinal direction properties.

EXAMPLE 11

One hundred parts of polypropylene (M.I., 2) were dry blended with 5 parts of clay on a super-mixer to form a blend which was molded into sheets having a thickness of 2 mm by the use of an extruder, T die (resin temperature, 210° – 240°C). The sheets were monoaxially drawn to an extent that a drawing ratio of 1500% was attained by the use of a roll-type longitudinally drawing machine (roll temperature, 130° – 140°C). The drawn sheets and chlorinated isotactic polypropylene films (chlorine content, 26 wt.%; thickness, 20 μ) were superposed "film upon sheet" alternately, while keeping the drawn directions of the drawn sheets parallel to each other, and the whole materials so alternately superposed were fusion bonded to one another under pressure as soon as sandwiched in a press at 110°C thereby to obtain a 5 mm thick plate-like material which is shown to be very excellent in longitudinal direction properties in Table 2.

EXAMPLE 12

One hundred parts of polyvinyl chloride (average degree of polymerization, 800), 5 parts of DBTM (tin malate type stabilizer as previously explained), 2 parts of DBTL (tin laurate type stabilizer as previously explained), 3 parts of VLTN-5 (lubricating agent as previously explained), 2 parts of butyl stearate and 50 parts of saw dust (50 mesh pass) were fusion mixed together at a resin temperature of 180° – 210°C on a Banbury mixer to form a mixture which was molded into 0.5 mm thick sheets at a roll temperature of 190° – 200°C by the use of a calender molding machine. The sheets thus obtained were monoaxially drawn to an extent that a drawing ratio of 600% was attained by the use of a roll-type longitudinally drawing machine (roll temperature, 160°C). As indicated in FIG. 2, the drawn sheets and soft polyvinyl chloride films (average degree of polymerization, 1300; 5 parts of DBTM, 2 parts of DBTL, 3 parts of VLTN-5 and 50 parts of tricresyl phosphate contained; thickness, 30 μ) were introduced to a thermostatically controlled chamber at 130°C wherein they were passed through between rolls to superpose them "film upon sheet" alternately, press and fusion bond them to each other thereby obtaining a 15 mm thick plate-like material which is shown in Table 2 to be very excellent in longitudinal direction properties.

EXAMPLE 13

One hundred parts of polystyrene (M.I., 1.4) were fusion mixed with 50 parts of calcium carbonate on a kneader (resin temperature, 160°– 180°C) to form a mixture thereof which was molded into 2 mm thick sheets by the use of a press at 200°C, and the sheets were monoaxially drawn to an extent that a drawing ratio of 700% was attained. The drawn sheets and soft polyvinyl chloride films (average degree of polymerization, 1300; 5 parts of DBTM, 2 parts of DBTL, 3 parts of VLTN-5 and 50 parts of tricresyl phosphate contained; thickness, 30 μ) were alternately superposed "film upon sheet" while keeping the drawn directions of the drawn sheets alternately crossed at right angles and then fusion bonded together as soon as sandwiched in a press at 110°C thereby obtaining a 5 mm thick plate-like material the properties of which are shown in Table 2. This Table shows the thus-obtained material to have well-balanced longitudinal and transverse direction properties.

EXAMPLE 14

One hundred parts of ABS resin (supplied under the trademark of CLARASTICK K-2938 by Sumitomo Chemical Industrial Co., Ltd., Japan) were fusion mixed with 100 parts of carbon black (HAF) on a kneader (resin temperature, 160° – 180°C), and the resulting mixture was molded into 2 mm thick sheets by using a press at 200°C and then monoaxially drawn to an extent that a drawing ratio of 500% was reached in an air thermostatically controlled chamber at 140°C. The drawn sheets and ethylene-vinyl acetate copolymer films (content of vinyl acetate units, 15 wt.%; M.I., 1.5; thickness, 30 μ) were superposed "film upon sheet" alternately while keeping the drawn directions of the drawn sheets parallel to each other, to press and fusion bond them to each other thereby obtaining a 5 mm thick plate-like material which is shown in Table 2 to have very excellent longitudinal direction properties.

Table 2

|  | *1 Bending modulus of elasticity × 10⁻³ L / T (Kg / cm²) | *1 Bending strength L / T (Kg/cm²) | *2 Tensile strength at break L / T (Kg/cm²) | *3 Izot impact strength L / T (ft-lb / inch of Notch) | Specific gravity |
|---|---|---|---|---|---|
| Example 9 | 65 / 24 | 612 / 184 | 472 / 196 | 26 / 11 | 0.3 |
| Example 10 | 51 / 22 | 374 / 226 | 272 / 231 | 8.4 / 6.5 | 1.2 |
| Example 11 | 30 / 11 | 486 / 147 | 427 / 124 | 14 / 3.5 | 0.6 |
| Example 12 | 75 / 32 | 576 / 212 | 442 / 126 | 24 / 4.5 | 0.4 |
| Example 13 | 43 / 44 | 472 / 465 | 287 / 292 | 11 / 9 | 0.3 |
| Example 14 | 68 / 27 | 552 / 146 | 392 / 112 | 27 / 12 | 0.4 |

*1 : Measured in accordance with ASTM-D-790
*2 : Measured at a deformation rate of 10%/min. by the use of a tester for tensile strength.
*3 : Measured in accordance with ASTM-D-256
L/T: Longitudinal/Transverse

EXAMPLE 15

One hundred parts of high-density polyethylene (density, 0.956; M.I., 0.3) were fusion mixed with 150 parts of calcium sulphate on a kneader at a resin temperature of 170° – 190°C, and the resulting mixture was pelletized. The pellets of the mixture so obtained and those of an ethylene-vinyl acetate copolymer (content of vinyl acetate, 10 wt.%; M.I., 1.5) were subjected to co-extrusion thereby to obtain a composite sheet comprising a 1 mm thick sheet of the mixture and a 120 μ thick coating of the copolymer formed on said sheet. The composite sheets were monoaxially drawn to an extent that a drawing ratio of 500% was attained, by the use of a roll-type longitudinally drawing machine at a roll temperature of 140° – 150°C. As shown in FIG. 2, the drawn composite sheets were introduced to a thermostatically controlled chamber at 110°C wherein they were passed through between rollers to superpose them one upon another while keeping the drawn directions of the composite sheets parallel to one another and fusion bond them together thereby obtaining a 5 mm thick plate-like material. The properties of this plate-like material are shown in Table 3, from which it is seen that the plate-like material is very excellent in longitudinal direction properties.

EXAMPLE 16

One hundred parts of polypropylene (M.I., 2), 400 parts of calcium carbonate and 5 parts of VLTN-5 (lubricating agent as previously explained) were fusion mixed together at a resin temperature of 170° – 190°C on a Banbury mixer, and the resulting mixer was molded into 0.5 mm thick sheets by the use of a calender molding machine (roll temperature, 180° – 190°C). The sheets were treated to be covered on one side with a 40 μ thick coating of chlorinated isotactic polypropylene, thus obtaining composite sheets. The composite sheets were monoaxially drawn to an extent that a drawing ratio of 50% was attained, by the use of a roll-type longitudinally drawing machine (roll temperature, 140° – 150°C). As shown in FIG. 3, the drawn composite sheets were introduced to a thermostatically controlled chamber at 120°C wherein they were passed through between rolls to superpose one upon another while keeping their drawn directions parallel to one another and fusion bond them together under pressure thereby obtaining a 5 mm thick plate-like material. Table 3 shows the properties of this plate-like material and clarifies that said material has very excellent longitudinal direction properties.

EXAMPLE 17

One hundred parts of polypropylene (M.I., 2) were dry blended with 5 parts of clay on a super-mixer to form a dry blend thereof. The dry blend and a low-density polyethylene (density, 0.923; M.I., 2) each in a pelletized form were subjected to co-extrusion thereby to obtain a composite sheet comprising a 4 mm thick sheet of the dry blend and an 0.5 mm thick coating of the polyethylene formed on each side of the sheet. The composite sheets were monoaxially drawn to an extent that a drawing ratio of 1500% by the use of a roll-type longitudinally drawing machine at a roll temperature of 140° – 150°C to obtain drawn composite sheets I. Separately, 100 parts of polypropylene (M.I., 2) were fusion blended with 50 parts of saw dust (20 mesh pass) on a Banbury mixer (resin temperature, 170° – 190°C) to form a mixture which was pelletized and extruded into 4 mm thick sheets by the use of an extruder, T die (resin temperature, 170° – 190°C). These sheets were then monoaxially drawn to an extent that a drawing ratio of 200% was attained, to obtain drawn sheets II. As shown in FIG. 3, the drawn composite sheets I and the drawn sheets II were introduced to a thermostatically controlled chamber at 110°C wherein the sheets I and II were superposed "sheet I upon sheet II" alternately while keeping the drawn directions of the sheets I and II parallel to each other, and then fusion bonded together under pressure thereby obtaining a 10 mm thick plate-like material the properties of which are shown in Table 3. This Table indicates that the plate-like material so obtained has very excellent longitudinal direction properties.

EXAMPLE 18

One hundred parts of polyvinyl chloride (average degree of polymerization, 800), 5 parts of DBTM (tin malate type stabilizer as previously explained), 2 parts of DBTL (tin laurate type stabilizer as previously explained), 3 parts of VLTN-5 (lubricating agent as previously explained), 2 parts of butyl stearate and 200 parts of carbon black (HAF) were fusion mixed together on a Banbury mixer (resin temperature, 180° – 210°C) to form a mixture which was pelletized thereby obtaining pellets thereof I. Separately, 100 parts of polyvinyl chloride (average degree of polymerization, 1300), 5 parts of DBTM, 2 parts of DBTL, 3 parts of VLTN-5 and 50 parts of tricresyl phosphate were fusion mixed together to form a mixture which was pelletized thereby obtaining pellets thereof II. The pellets I and II were subjected to co-extrusion thereby to obtain a composite sheet comprising a 3 mm thick sheet of pellet I and a 200 μ thick coating of pellet II formed on one side thereof. The composite sheets thus obtained were monoaxially drawn to an extent that a drawing ratio of 800% was attained by a roll-type longitudinally drawing machine at a roll temperature of 140° - 150°C and, as indicated in FIG. 3, the drawn composite sheets were passed to a thermostatically controlled chamber at 110°C wherein they were passed through between rolls thereby to superpose them one upon another while keeping the drawn directions of the sheets parallel to one another and fuse bond them together under pressure, thus obtaining a 5 mm thick plate-like material. The properties of the plate-like material so obtained are shown in Table 3, from which it is seen that said material is one having excellent longitudinal direction properties.

EXAMPLE 19

One hundred parts of polystyrene (M.I., 1.4) were fusion mixed with 50 parts of talc on a kneader (resin temperature, 160° - 180°C), and the resulting mixture was pelletized to obtain pellets I.

On the other hand, one hundred parts of polyvinyl chloride (average polymerization degree, 1300), 5 parts of DBTM, 2 parts of DBTL, 3 parts of VLTN-5 and 50 parts of dioctyl phthalate were kneaded together on rolls (roll temperature, 150° - 160°C) and then pelletized to obtain pellets II.

The pellets I and II were subjected to co-extrusion thereby to obtain a composite sheet comprising a 1 mm thick sheet (from the pellets I) and a 100 μ thick coating (from the pellets II) formed at one side thereof.

The composite sheets so obtained were monoaxially drawn to an extent that a drawing ratio of 50% was attained in an air thermostatically controlled chamber at 140°C, and the composite sheets so drawn were superposed one upon another while keeping their drawn directions alternately crossed at right angles and were then fusion bonded together under pressure as soon as sandwiched in a press at 110°C, thereby obtaining a 5 mm thick plate-like material. The properties of this plate-like material are shown in Table 3, from which it is seen that said material has well-balanced longitudinal and transverse direction properties.

EXAMPLE 20

One hundred parts of ABS resin (supplied under the trakemark of CLARASTICK K-2938 by Sumitomo Chemical Industrial Co., Ltd., Japan) were fusion mixed with 100 parts of a sediment (20 mesh pass) from settling ponds of pulp-making factories, by the use of a Banbury mixer (resin temperature, 170°-190°C), and the resulting mixture was pelletized thereby obtaining pellets I.

The pellets I and ethylene-vinyl acetate copolymer pellets II (content of vinyl acetate, 15 wt.%; M.I., 1.5) were subjected to co-extrusion thereby obtaining a composite sheet comprising a 2 mm thick sheet (from the pellets I) and a 50 μ thick coating (from the pellets II) formed on one side thereof. The composite sheets so obtained were monoaxially drawn to an extent that a drawing ratio of 200% was attained in an air thermostatically controlled chamber at 150°C, and the drawn composite sheets were superposed one upon another while keeping their drawn directions parallel to one another and were then fusion bonded together under pressure as soon as sandwiched in a press at 100°C thereby obtaining a 5 mm thick plate-like material. Table 3 shows the properties of the plate-like material and clarifies that said material is very excellent in longitudinal direction properties.

Table 3

|  | *1 Bending modulus of elasticity × $10^{-3}$ L/T (Kg/cm$^2$) | *1 Bending strength L/T (Kg/cm$^2$) | *2 Tensile strength at break L/T (Kg/cm$^2$) | *3 Izot impact strength L/T (ft-lb/inch of Notch) | Specific gravity |
| --- | --- | --- | --- | --- | --- |
| Example 15 | 67 / 20 | 571 / 145 | 424 / 135 | 23 / 8.4 | 0.4 |
| Example 16 | 73 / 26 | 465 / 212 | 395 / 211 | 14 / 6.5 | 0.8 |
| Example 17 | 69 / 34 | 552 / 175 | 411 / 124 | 26 / 9.5 | 0.4 |
| Example 18 | 79 / 31 | 612 / 245 | 472 / 136 | 27 / 8.4 | 0.3 |
| Example 19 | 46 / 46 | 437 / 438 | 296 / 291 | 10 / 11 | 0.3 |
| Example 20 | 71 / 29 | 550 / 132 | 396 / 124 | 24 / 11 | 0.4 |

*1 : Measured in accordance with ASTM-D-790
*2 : Measured at a deformation velocity of 10%/min. by use of a tester for tensile strength.
*3 : Measured in accordance with ASTM-D-256
L/T: Longitudinal/Transverse

What is claimed is:

1. A process for the preparation of a synthetic wood comprising the steps of:

fusion mixing a composition consisting essentially of 100 parts by weight of a thermoplastic resin and 5 - 400 parts by weight of an inorganic particulate filler to form a mixture thereof, the thermoplastic resin being selected from the group consisting of homopolymers of the monomers ethylene, propylene, styrene, vinyl chloride and vinylidene chloride, copolymers of at least two of said monomers, blends of said homopolymers and said copolymers, and mixtures of rubber with said homopolymers and said copolymers molding the mixture into sheets, having a thickness of at least 0.5 mm, drawing the sheets only monoaxially and to an extent that a drawing ratio of 50 - 1500% is attained, heating the drawn sheets for a time sufficient to permit their surfaces to be heated to temperatures not lower than the melting point of the sheets while their interior remains at a temperature lower than said melting point, superposing the thus heated drawn sheets one upon another, fusion bonding the thus heated, superposed sheets together, and allowing the fusion bonded mass to cool thereby obtaining the synthetic wood.

2. A process according to claim 1, wherein the particulate filler is a member selected from the group consisting of calcium carbonate, magnesium carbonate, calcium sulphate, calcium sulphite, silicon dioxide, titanium dioxide, barium sulphate, diatomaceous earth, talc, clay, Hedoro and carbon black.

3. A process according to claim 1, further comprising interposing a thermoplastic resin film between all of the sheets before the heating step, the thermoplastic resin films having a lower melting point than the sheets and being capable of being satisfactorily bonded thereto, and wherein the heating is affected for a time sufficient to heat the resin films to a temperature not lower than the melting point thereof while allowing the interior of the sheets to remain at a temperature lower than the melting point thereof.

4. A process according to claim 3, wherein the thermoplastic resin of the films is a member selected from low-density polyethylene, ethylene-vinyl acetate copolymers, ethylene-acrylic acid copolymers, chlorinated polypropylene, maleic-modified polypropylene and soft polyvinyl chloride, the thermoplastic resin of the films having a lower melting point than the thermoplastic resin of the sheets.

5. A process according to claim 3, wherein the particulate filler is a member selected from the group consisting of calcium carbonate, magnesium carbonate, calcium sulphate, calcium sulphite, silicon dioxide, titanium dioxide, barium sulphate, diatomaceous earth, talc, clay, Hedoro and carbon black.

6. A process according to claim 1 further comprising coating the sheets on at least one side with a thermoplastic resin immediately before or after the drawing step, the thermoplastic resin coating having a lower melting point than the sheets and being capable of being satisfactorily bonded thereto, and wherein the heating is effected for a time sufficient to heat the resin coating to a temperature not lower than the melting point thereof while allowing the interior of said sheets to remain at a temperature lower than the melting point thereof.

7. A process according to claim 6, wherein the thermoplastic resin of the resin coating is a member selected from the group consisting of low-density polyethylene, ethylene-vinyl acetate copolymers, ethylene-acrylic acid copolymers, chlorinated polypropylene, maleic-modified polypropylene, low-density polyethylene and soft polyvinyl chloride, the thermoplastic resin of the resin coating having a lower melting point than the thermoplastic resin of the sheets.

8. A process according to claim 6, wherein the particulate filler is selected from the group consisting of calcium carbonate, magnesium carbonate, calcium sulphate, calcium sulphite, silicon dioxide, titanium dioxide, barium sulphate, diatomaceous earth, talc, clay, Hedoro and carbon black.

* * * * *